US010954320B2

(12) United States Patent
Garg et al.

(10) Patent No.: US 10,954,320 B2
(45) Date of Patent: Mar. 23, 2021

(54) HIGH DENSITY POLYETHYLENE FOR THE PRODUCTION OF PIPES

(71) Applicant: SABIC GLOBAL TECHNOLOGIES B.V., Bergen op Zoom (NL)

(72) Inventors: Priya Garg, Vaals (NL); Nicolaas Hendrika Friederichs, Brunssum (NL); Eric Johannes Cornelia Janssen, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 140 days.

(21) Appl. No.: 15/776,859

(22) PCT Filed: Nov. 21, 2016

(86) PCT No.: PCT/EP2016/078221
§ 371 (c)(1),
(2) Date: May 17, 2018

(87) PCT Pub. No.: WO2017/089248
PCT Pub. Date: Jun. 1, 2017

(65) Prior Publication Data
US 2018/0355076 A1      Dec. 13, 2018

(30) Foreign Application Priority Data

Nov. 23, 2015   (EP) .................................... 15195831

(51) Int. Cl.
| *C08F 110/02* | (2006.01) |
| *C08F 210/16* | (2006.01) |
| *B32B 27/08* | (2006.01) |
| *B32B 27/32* | (2006.01) |
| *C08F 10/02* | (2006.01) |

(52) U.S. Cl.
CPC .............. *C08F 10/02* (2013.01); *B32B 27/08* (2013.01); *B32B 27/32* (2013.01); *C08F 110/02* (2013.01); *C08F 210/16* (2013.01)

(58) Field of Classification Search
CPC ...... C08F 110/02; C08F 210/16; C08F 4/656; B32B 27/08; B32B 27/32
See application file for complete search history.

(56) References Cited

U.S. PATENT DOCUMENTS

| 2005/0119413 | A1* | 6/2005 | Maziers | .................. | C08L 23/06 |
| | | | | | 525/240 |
| 2013/0245218 | A1* | 9/2013 | Moman | ..................... | C08F 4/52 |
| | | | | | 526/183 |

FOREIGN PATENT DOCUMENTS

| WO | 9946308 A1 | 9/1999 | |
| WO | 2007003530 A1 | 1/2007 | |
| WO | 2009112254 A1 | 9/2009 | |
| WO | 2009127410 A1 | 10/2009 | |
| WO | 2010051419 A1 | 5/2010 | |
| WO | 2010063444 A1 | 6/2010 | |
| WO | WO-2016091872 A1 * | 6/2016 | ............ C08F 210/16 |

OTHER PUBLICATIONS

"PE 100 Pipe systems" Second edition, edited by Heiner Brömstrup (2004), pp. 16-44.
Budinski, "Resistance to particle abrasion of selected plastics," Wear 203-204 (1997) 302-309.
International Search Report for International Application No. PCT/EP2016/078221; International Filing Date: Nov. 21, 2016; dated Feb. 16, 2017; 5 Pages.
Peacock, Andrew J., "Handbook of Polyethylene", Chapter 3 Production Processes, 2000, Marcel Dekker, Inc., New York; ISBN 0824795466; p. 43-66.
Written Opinion of the International Searching Authority for International Application No. PCT/EP2016/078221; International Filing Date: Nov. 21, 2016; dated Feb. 16, 2017; 4 Pages.

* cited by examiner

*Primary Examiner* — Caixia Lu
(74) *Attorney, Agent, or Firm* — Cantor Colburn LLP

(57) ABSTRACT

The invention is directed to polyethylene having a density in the range≥940 and ≤960 kg/m³, Melt Flow Rate 190/21.6≥1.5 and ≤4.0 g/10 min at 190 degrees Celsius and MWD≥3 and ≤12. The polyethylene is applied in the production of pipes.

12 Claims, No Drawings

HIGH DENSITY POLYETHYLENE FOR THE PRODUCTION OF PIPES

CROSS REFERENCE TO RELATED APPLICATIONS

This application is a 371 of International Application No. PCT/EP2016/078221, filed Nov. 21, 2016, which claims priority to European Application No. 15195831.1 filed Nov. 23, 2015, which are incorporated herein by reference in their entirety.

The invention is directed to high density polyethylene for the production of pipes.

High density polyethylene pipe materials can be produced by using low pressure polymerisation processes. For example, pipe materials of the performance class PE 80 and PE 100 are generally produced in cascade plants by a so called bimodal or multimodal process. The production processes for bimodal high density polyethylene (HDPE) are summarised at pages 16-20 of "PE 100 Pipe systems" (edited by Brömstrup; second edition, ISBN 3-8027-2728-2). Suitable low pressure processes are slurry cascade of stirred reactors, slurry cascade of loop reactors and a combination of different processes such as slurry loop gas phase reactor. It is also possible to use a multimodal polyethylene, preferably trimodal polyethylene, as described for example in WO2007003530, as high density polyethylene pipe material.

In industrial and municipal fields of application pipes made of polyethylene are used for the transport of many different media from drinking water to contaminated sewage and chemical and physical mixtures and gases or slurries or other multiphase systems. Slurry pipelines are applied to transport for example coarse and fine sand, coal, clay, phosphate, limestone and stone and rock fragments.

An important technical field for these slurry pipes is the mining operation as described for example in WO 2010051419. Mining operations require the transport of highly abrasive particulate or slurry streams containing for example iron ore, coal and coal dust. Often, metal pipes, such as carbon steel or cast iron pipes, are used for the transport of these highly abrasive streams. They may be expensive, prone to corrosion, heavy and only provide a temporary solution since they are eventually destroyed. Use of plastic pipes, pipe liners and pipe coatings has been proposed to reduce these shortcomings. The material selection is critical because many materials cannot stand up to such highly-abrasive mining streams and are quickly worn out. For example, high density poly ethylene pipes can be used as liners for sanitary sewer and wastewater pipelines but they may degrade under highly abrasive conditions resulting in a shorter service lifetime. Corrosion, erosion and abrasion are problems that must be taken into account when designing slurry pipelines. WO 2010051419 discloses multilayer polyolefin pipe concepts with tie layers wherein the outside layer preferably comprises rubbers, elastomers or ionomer terpolymers. WO 2010051419 discloses furthermore concepts directed to fibre reinforced polyolefin pipes and polyolefin lined metal pipe. WO 2010051419 summarizes prior art disclosing potential solutions for the continuous need to improve the abrasion resistance of polyolefin based pipes. More information about abrasion resistance is disclosed at page 29 of "PE 100 Pipe systems" (edited by Brömstrup; second edition, ISBN 3-8027-2728-2).

Budinski et al disclose in "Resistance to particle abrasion of selected plastics" (Wear 203-204; 1997; 302-309) that ultra-high molecular weight polyethylene and polyurethane are the best polymers for obtaining abrasion resistant properties. These polymers cannot be applied for the production of HDPE pipes because UHMWPE cannot be extruded and there exist conversion process problems when added to polyethylene layers (gels, poor mixing and/or viscosity increase).

It is the object of the present invention to provide an extrudable HDPE based slurry pipe which has improved abrasion resistance in combination with other requirements such as a high internal pressure time to failure, outstanding resistance to slow crack growth and good resistance to rapid crack propagation.

The object is obtained with polyethylene having a monomodal distribution, a density in the range $\geq 939$ and $\leq 960$ kg/m$^3$ (measured according to ISO 1183 A), Melt Flow Rate $_{190/21.6} \geq 1.5$ and $\leq 4.0$ g/10min at 190 degrees Celsius (measured according to ISO1133), MWD$\geq 3$ and $\leq 12$, shape of molecular weight distribution as described by half width between 1.0 and 1.45 and wherein polyethylene is obtained with a Ziegler Natta catalyst.

The density is measured according to ISO 1183 A.

The Melt Flow Rate (MFR) $_{190/21.6}$ or Melt flow Index (MFI) $_{190/21.6}$ is measured according to ISO 1133 (190° C.; 21.6 kg).

The molecular weight distribution (MWD) is measured by using size exclusion chromatography (SEC). MWD is calculated as ratio of the weight average molar mass to the number average molar mass.

The shape of the molecular weight distribution is characterized by the half width which is defined as the width of the MWD (Dlog($M_w$)) at half the height peak ,H (as disclosed in WO9946308).

Polyethylene may comprise a comonomer for example 1-butene or 1-hexene.

An example of a suitable catalyst system is a catalyst system which comprises

I. the solid reaction product obtained by reaction of:
(a) a hydrocarbon solution comprising
   (1) an organic oxygen containing magnesium compound or a halogen containing magnesium compound and
   (2) an organic oxygen containing titanium compound and
(b) a mixture comprising a metal compound having the formula MeR$_n$X$_{3-n}$ in which X is a halogenide, Me is a metal of Group III of Mendeleev's Periodic System of Chemical Elements, R is a hydrocarbon radical containing 1-10 carbon atoms and $0 \leq n \leq 3$ and a silicon compound of formula R$_m$SiCl$_{4-m}$ wherein $0 \leq m \leq 2$ and R is a hydrocarbon radical containing 1-10 carbon atoms wherein the molar ratio of metal from (b): titanium from (a) is lower than 1:1 and II. an organo aluminium compound having the formula AlR$_3$ in which R is a hydrocarbon radical containing 1-10 carbon atoms.

Another example of a suitable catalyst system is a catalyst system that comprises
(I) the solid reaction product obtained from the reaction of:
   a) a hydrocarbon solution containing
   1) an organic oxygen containing magnesium compound or a halogen containing magnesium compound and
   2) an organic oxygen containing titanium compound and
      b) an aluminium halogenide having the formula AlR$_n$X$_{3-n}$ in which R is a hydrocarbon radical containing 1-10 carbon atoms, X is halogen and $0<n<3$ and (II) an aluminium compound having the formula $AlR_3$ in which R is a hydrocarbon radical containing 1-10 carbon atom.

The catalysts are disclosed for example in WO 2009112254.

The high density polyethylene may be a natural grade HDPE and may be a compound comprising HDPE and an additive pigment for example HDPE may be a compound comprising carbon black or another colorant or pigment as desired for specific industrial applications. The pigment may be for example coloured black, blue or orange.

Preferably the high density polyethylene is a natural grade HDPE.

According to a preferred embodiment of the invention the high density polyethylene has a polymer density≥939 and ≤955 kg/m³ and Melt Flow Rate $_{190/21.6}$≥1.8 and ≤3.0 g/10 min.

According to a preferred embodiment of the invention the polyethylene has a density in the range≥940 and ≤960 kg/m³.

The polyethylene according to the present invention can be applied to produce a pipe. The pipe may be a pressure pipe or a non-pressure pipe. The preferred pipe is a non-pressure pipe.

The pipe according to the present invention shows an improvement of the abrasion resistance while maintaining the other required characteristics of the pipe.

The polymer is extrudable because the MFR $_{190/21.6}$ is higher than 1.5.

The invention is also directed to an extrudable polyethylene having a density in the range ≥939 and ≤960 kg/m³ (measured according to ISO 1183 A), Melt Flow Rate $_{190/21.6}$≥1.5 and ≤4.0 g/10min (measured according to ISO1133), MWD≥3 and ≤12 , shape of molecular weight distribution as described by half width between 1.0 and 1.45 and having an abrasion resistance of less than 300% (measured according to ISO15527:2010 Annex B for 24 hours using the abrasion of GUR® 4120 of Ticona sample as the reference at 100%). Preferably polyethylene is obtained with a Ziegler Natta catalyst.

According to a preferred embodiment of the invention the polyethylene is applied in a pipe comprising the polyethylene as the only polymer.

According to a further preferred embodiment of the invention the polyethylene is applied in a multi-layer pipe system comprising at least one layer comprising the polyethylene according to the invention. Preferably the polyethylene according to the invention is used as the inner layer of the pipe. The other layers, such as the outer layer, may comprise other polymers for example HDPE with other characteristics. Examples of suitable HDPE include for example unimodal or bimodal PE 80, bimodal PE 100 or multimodal HDPE resin. PE 80 is a PE material with an MRS (minimum required strength after 50 years for water at 20 degrees Celsius) of 8 MPa and PE 100 is a PE material with an MRS of 10 MPa. The pipe classification is elucidated at page 35 of "PE 100 Pipe systems" (edited by Brömstrup; second edition, ISBN 3-8027-2728-2). The thickness of the outer layer depends on the intended service pressure. The thickness of the inner layer depends on the nature of slurry, service conditions (for example flow speed and temperature) and the required lifetime.

The selection of the thickness depends amongst others from the pressure category and the diameter of the pipe. The concept according to the present invention does not require the presence of a tie layer, fibres or abrasion resistant fillers. The main benefit of the second layer is the improvement of the abrasion resistance. The polyethylene according to the invention in the inner layer protects the outer layer (necessary for the pressure resistance) from abrasion by for example slurries. The second layer is an additional layer to the pipe, for example pressure pipe, and does not significantly contribute to the structural stability of the pipe. The outer layer assures the mechanical integrity of the pipe. If desired for a specific application the polymer composition of each layer may also contain appropriate amounts of other additives such as for example fillers, antioxidants, pigments, stabilisers, antistatic agents and polymers. The multi-layer pipe according to the invention may comprise more than 2 layers for example 3 and 5 layers. If desired for a specific application it is possible to divide each layer in more layers to obtain specific properties of each layer. It is also possible to include layers containing other polymers for example polypropylene for protection of the outside layer.

The production processes of HDPE are summarised in Handbook of Polyethylene by Andrew Peacock (2000; Dekker; ISBN 0824795466) at pages 43-66.

The manufacture of pipes is described for example at pages 43-44 of "PE 100 Pipe systems" (edited by Brömstrup; second edition, ISBN 3-8027-2728-2). The extruded pipe according the invention is produced from HDPE in molten state and the multi-layer structure may be produced in one step process through coextrusion.

The slurry pipelines according to the invention are suitable to transport a mixture of for example liquids and solids. Solids may be for example course and fine sand, coal, clay, phosphate, iron, limestone or stone and rock fragments. It is also possible to transport organic matter for example seafood and fish or animal food. In general the slurry pipes may transport contaminated sewage and chemical and physical mixtures and gases or slurries or other multiphase systems.

WO9946308 is directed to a polyethylene obtained with a tridentate nitrogen containing transition metal polymerization catalyst. As a comparative example HOSTALEN GM 6255 having a density 953 kg/m³ , Melt Flow Rate 2.2, MWD 8.5 and shape of molecular weight distribution as described by half width 1.52 is disclosed.

WO2010063444 is directed to a chromium catalyst based polyethylene to be applied in the production of open head drums.

The invention will be further elucidated by the following non-restrictive examples.

EXAMPLES

Measurements

MFR21.6: The melt-indice MFR 190/21.6 or Melt flow Index (MFI) was measured according to method ISO1133 under a load of 21.6 kg at 190° C.

Density: The density of the polymers is measured according to ISO1183.

Bulk density measurements are performed according to DIN ISO 60:2000-01

The molecular weight distribution is measured by using size exclusion chromatography (SEC). In the examples this was done by using an Agilent PL-GPC210 instrument equipped with 2 columns (Polymer Laboratories 20 μm PLgel Mixed-A LS, 300×7.5 mm) at an oven temperature of 160° C. and flow rate of 0.5 mL/min. An IR detector (Polymer Char IR5) and multi-angle light scattering detector (Wyatt DAWN EOS) were used. The instrument was calibrated with linear PE standards.

The molecular weight distribution (MWD) or polydispersity index (PDI) is calculated as ratio of the weight average molar mass to the number average molar mass. The MWD or PDI gives an indication of the broadness of the distribution.

The shape of the distribution is characterized by the half width which is defined as the width of the MWD(Dlog $(M_w)$ at half the height peak ,H.(as disclosed in WO9946308).

The amount of short chain branches have been measured using 1H NMR. The samples have been prepared by adding ~0.5 ml of tetrachloroethane-d2 to a ~10 mg of material in a 5 mm NMR tube. The samples have been dissolved and homogenized by heating the tubes and their contents to 130° C. The 1H NMR spectra have been recorded at 125° C. on a 500 MHz NMR spectrometer equipped with a 10 mm cryo-probe. A 30° pulse has been used and 1024 transients have been accumulated using a pulse repetition delay of 20 s. A spectral width of 10 kHz and 64K data points have been collected.

The relative weight loss is determined according to the abrasion test wherein the PE samples were first compression moulded according to DIN EN ISO 15527: 2013-05. Thereafter, the abrasion test was carried out according to ISO15527:2010 Annex B. A slurry of sand and water was used in the test. Weight loss was calculated after a testing time of 24 hours. GUR® 4120 (Ticona) was used as the reference grade. The relative weight loss (in %) (relative to the reference grade) is given in the Table 2.

Catalyst Preparation

The catalysts used in Examples I, II and Comparative Examples B and C were prepared according to the procedure of Example II of WO2009127410.

In Example I, an aluminum to titanium molar ratio of 6 is applied in the preparation of the catalyst.

In Examples II and Comparative Examples B and C an aluminum to titanium molar ratio of 8.5 is used.

The catalyst used in Example III was prepared according to the procedure as disclosed in Example VII of WO 2009112254.

The catalysts were used in the form of a suspension in hexanes.

Examples I, III and Comparative Example B

Ethylene Homo-polymerization 10 liters of dry hexanes were added to a reactor having an internal volume of 20 liters and equipped with a stirrer. Next, a hexane solution of 2.0 mol/L triisobutyl aluminum (TiBAl) was added to the reactor. The contents were heated to the desired polymerization temperature while stirring at 750 RPM. Ethylene and hydrogen were added in a certain ratio of partial pressures ($pC_2$ respectively $pH_2$) to reach a desired pressure in the reactor. Next, an aliquot of the catalyst suspension according one of the above identified catalyst preparation as indicated in the Table 1, containing a previously determined amount of solid catalyst, was added to the reactor to start the polymerization. The total pressure in the reactor was kept constant by dosing ethylene. The hydrogen over ethylene ratio in the headspace of the reactor ($H_2/C_2$) was continuously monitored by gas chromatography and was kept constant by dosing hydrogen on demand. After a polymerization time of 120 minutes, the pressure in the reactor was reduced to ambient conditions and the reactor was flushed with nitrogen. The reactor temperature was cooled to 35° C. and the slurry was subsequently filtered to collect the wet polymer fluff. The polymer was subsequently rinsed with 10 liters of hexanes, collected and dried in an oven at 40° C. under vacuum for 18 hours. The dried polymer was weighed and analyzed on poured bulk density, density and melt-flow index ($_{MFR190/21.6}$). The applied settings for the polymerization experiments can be found in Table 1.

Example II

Ethylene-Butene Copolymerization

The procedure for these experiments were similar to the ethylene homo-polymerization procedure as described above, except for the fact that 1-butene was metered into the reactor directly after hydrogen dosing (before ethylene dosing), before the start of the polymerization. The 1-butene to ethylene molar ratio in the headspace ($C_4/C_2$) of the reactor was continuously measured by gas chromatography and 1-butene was fed on demand to keep the ratio at the desired value. The applied settings for the polymerization experiments can be found in Table 1.

Comparative Example C

Bimodal Polymerization Procedure

A bimodal polymerization consists of two consecutive polymerization steps (step 1 and step 2). The procedure for step 1 was similar to the ethylene homo-polymerization procedure according to Example I, except for the fact that polymerization time is 180 minutes and the polymer suspension containing the still active catalyst remains in the reactor. The amount of polymer produced is calculated using the ethylene uptake as measured by means of a mass flow meter. The reactor pressure is subsequently vented to remove the hydrogen and ethylene. Next the conditions for the step 2 are applied. The procedure for step 2 was similar to the ethylene-butene co-polymerization procedure as described in Example II, except for the fact that the polymerization is stopped when a desired ethylene uptake is reached, in this case the amount of polymer produced in step step 2 was set to equal the amount produced in step 1.

TABLE 1

Overview of polymerization experiments

| Example | Catalyst (mg) | TiBAl (mL) | Temp (° C.) | $pC_2$ (bar) | $H_2/C_2$ | $C_4/C_2$ | Yield (g) | $MFR_{190/21.6}$ (dg/min) | Bulk density (kg/m³) | Density (kg/m³) |
|---|---|---|---|---|---|---|---|---|---|---|
| I | 20 | 4 | 80 | 2.5 | 0.132 | — | 1208 | 2.2 | 422 | 952 |
| II | 20 | 4 | 80 | 1.5 | 0.146 | 0.014 | 1240 | 2.1 | 295 | 939 |
| III | 40 | 7.5 | 75 | 4.0 | 0.250 | — | 693 | 1.8 | 404 | 950 |
| B | 20 | 4 | 80 | 1.5 | 0,155 | — | 1227 | 1.0 | 323 | 951 |
| C (step 1) | 30 | 4 | 85 | 1.2 | 1.197 | — | | | | |
| C (step 2) | | | 80 | 1.7 | 0.000 | 0.075 | 1210 | 2.4 | 945 | 365 |

The PE powder was stabilised by adding 2000 ppm of calcium stearate, 2000 ppm of Irganox 1010 and 1000 ppm of Irgafos 168. The stabilised powder was extruded into pellets using a lab scale co-rotating twin screw extruder having L/D of 25.5, throughput of 50 g/min and rpm of 100.

Comparative Example A is commercial grade Basell Histif 5431Z.

Comparative example B could not be melt extruded.

TABLE 2

Overview of polymer characteristics.

| Examples | MFR$_{190/21.6}$ (dg/min) | Density (kg/m³) | Mn | Mw | MWD | Short chain branching content (weight %) | Relative weight loss from abrasion test (%) | MWD half width |
|---|---|---|---|---|---|---|---|---|
| I | 2.2 | 952 | 64 | 290 | 4.5 | 0.2 | 272 | 1.20 |
| A | 2.2 | 955 | 40 | 520 | 13 | 0.1 | 346 | 1.64 |
| II | 2.1 | 939 | 51 | 430 | 8.5 | 0.9 | 211 | 1.42 |
| B | 1.0 | 951 | 57 | 540 | 9.5 | <0.1 | 210 | 1.52 |
| III | 1.8 | 950 | 61 | 280 | 4.5 | <0.1 | 271 | 1.18 |
| C | 2.4 | 945 | 24 | 480 | 20 | 1.1 | 467 | 2.11 |

These examples show:

A. Example I and Example A have comparable MFR and density and both grades are extrudable. Example I shows abrasion test values lower than 300%.

B. Example II and Example B have comparable abrasion test values. Example II is melt extrudable whereas Example B is not melt extrudable.

C. Example III has lower molar mass (Mw) and lower amount of short chain branching content as compared to Example C. Remarkably, Example III shows superior abrasion test values in comparison to Example C.

The invention claimed is:

1. Polyethylene having
a monomodal distribution,
a density in the range ≥939 and ≤960 kg/m³ (measured according to ISO 1183 A),
a Melt Flow Rate $_{190/21.6}$ in the range of ≥1.5 and ≤4.0 g/10min at 190 degrees Celsius (measured according to ISO1133),
an MWD in the range of ≥3 and ≤12,
a shape of molecular weight distribution as described by half width between 1.0 and 1.45, and
wherein the polyethylene is obtained with a Ziegler Natta catalyst.

2. The polyethylene according to claim 1, wherein the density is ≥939 and ≤955 kg/m³ and
the Melt Flow Rate $_{190/21.6}$ is ≥1.8 and ≤3.0 g / 10 min.

3. Extrudable polyethylene having
a density in the range ≥939 and ≤960 kg/m³ (measured according to ISO 1183 A),
a Melt Flow Rate $_{190/21.6}$ in the range of ≥1.5 and ≤4.0 g/10min (measured according to ISO1133),
an MWD in the range of ≥3 and ≤12,
a shape of molecular weight distribution as described by half width between 1.0 and 1.45 and
having an abrasion resistance of less than 300% (measured according to ISO15527:2010 Annex B for 24 hours using the abrasion of GUR® 4120 of Ticona sample as the reference at 100%).

4. A pipe comprising a polymer, wherein the polymer is only the polyethylene according to claim 3.

5. A multi-layer pipe comprising at least one layer comprising polyethylene according to claim 3 as the inner layer of the pipe.

6. The multi-layer pipe according to claim 5, wherein the pipe is a slurry pipe.

7. The multi-layer pipe accordingly to claim 5, wherein the outer layer comprises a polyethylene material with an MRS of 8 MPa and PE 100 is a PE material with an MRS of 10 MPa. The pipe classification is elucidated at page 35 of "PE 100 Pipe systems" (edited by Brömstrup; second edition, ISBN 3-8027-2728-2).

8. The pipe according to claim 4, wherein the pipe is a slurry pipe.

9. A pipe comprising a polymer, wherein the polymer is only the polyethylene according to claim 1.

10. The pipe according to claim 8, wherein the pipe is a slurry pipe.

11. A multi-layer pipe comprising a layer comprising polyethylene according to claim 1 as the inner layer of the pipe.

12. The pipe according to claim 10, wherein the pipe is a slurry pipe.

* * * * *